United States Patent [19]

Shiomi

[11] Patent Number: 6,070,015
[45] Date of Patent: *May 30, 2000

[54] IMAGE BLUR PREVENTION APPARATUS WITH REWRITABLE MEMORY FOR STORING IMAGE BLUR RESPONSE

[75] Inventor: Yasuhiko Shiomi, Kawaguchi, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/340,804

[22] Filed: Nov. 17, 1994

Related U.S. Application Data

[63] Continuation of application No. 07/888,983, May 26, 1992, abandoned.

[30] Foreign Application Priority Data

May 27, 1991 [JP] Japan .................................. 3-149333
May 27, 1991 [JP] Japan .................................. 3-149334

[51] Int. Cl.[7] .................................................. G03B 17/24
[52] U.S. Cl. .............................. 396/55; 348/208; 348/231
[58] Field of Search .......................... 354/70, 76, 195.1, 354/195.12, 202, 400, 430; 348/208, 231; 396/52, 53, 55

[56] References Cited

U.S. PATENT DOCUMENTS

| Re. 34,140 | 12/1992 | Nakajima | 354/412 |
|---|---|---|---|
| 5,012,270 | 4/1991 | Sekine et al. | 354/430 |
| 5,043,816 | 8/1991 | Nakano et al. | 348/231 X |
| 5,136,159 | 8/1992 | Nakazawa et al. | 250/230 |
| 5,175,580 | 12/1992 | Shiomi | 354/430 X |

FOREIGN PATENT DOCUMENTS 2-59718  2/1990  Japan .

*Primary Examiner*—David M. Gray
*Attorney, Agent, or Firm*—Robin, Blecker & Daley

[57] ABSTRACT

A control apparatus for an image blur prevention device having a feedback loop for performing control of image blur prevention comprises a rewritable memory for storing outset information of a characteristic of the feedback loop for performing control of image blur prevention and determination circuitry for determining a further characteristic of the feedback loop in accordance with the information stored in the memory.

25 Claims, 12 Drawing Sheets

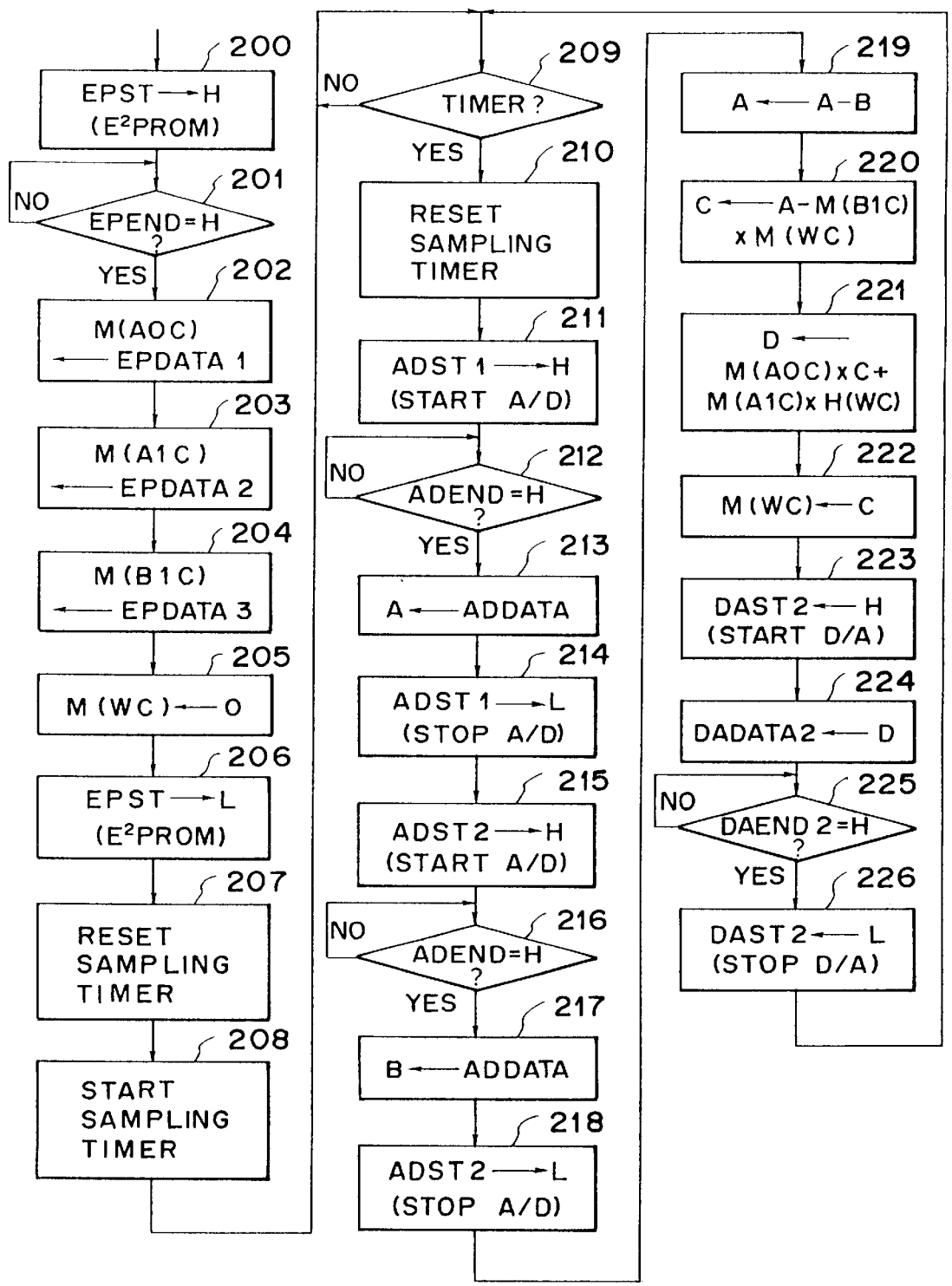

FIG. 4

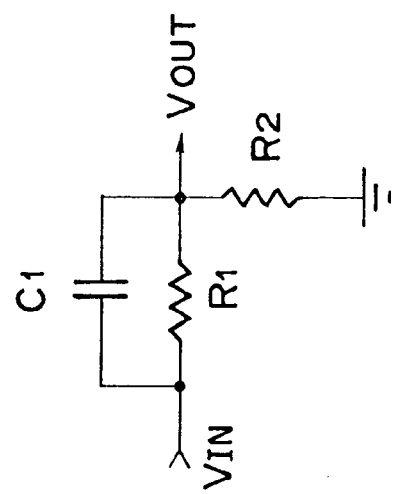

$$H(S) = \frac{V_{OUT}}{V_{IN}} = \frac{R_2 + S \times C_1 \times R_1 \times R_2}{R_1 + R_2 + S \times C_1 \times R_1 \times R_2}$$

$$\rightarrow \frac{\frac{1}{C_1 \times R_1} + \frac{2}{T}}{\frac{R_1+R_2}{C_1 \times R_1 \times R_2} + \frac{2}{T}} + \frac{\frac{1}{C_1 \times R_1} - \frac{2}{T}}{\frac{R_1+R_2}{C_1 \times R_1 \times R_2} + \frac{2}{T}} Z^{-1}$$

$$H(Z) = \frac{\frac{\frac{1}{C_1 \times R_1} - \frac{2}{T}}{\frac{R_1+R_2}{C_1 \times R_1 \times R_2} + \frac{2}{T}} Z^{-1}}{1 + \frac{\frac{R_1+R_2}{C_1 \times R_1 \times R_2} - \frac{2}{T}}{\frac{R_1+R_2}{C_1 \times R_1 \times R_2} + \frac{2}{T}} Z^{-1}} = \frac{AOC + AOCZ^{-1}}{1 + BICZ^{-1}}$$

T: (SAMPLING TIME)

$$H(S) = \frac{V_{OUT}}{V_{IN}} = \frac{S \times C_1 \times R_1}{1 + S \times C_1 \times R_1}$$

$$H(Z) = \frac{\dfrac{\frac{2}{T}}{\dfrac{1}{C_1 \times R_1} + \dfrac{2}{T}} + \dfrac{-\frac{2}{T}}{\dfrac{1}{C_1 \times R_1} + \dfrac{2}{T}} Z^{-1}}{1 + \dfrac{\dfrac{1}{C_1 \times R_1} - \dfrac{2}{T}}{\dfrac{1}{C_1 \times R_1} + \dfrac{2}{T}} Z^{-1}} = \frac{A0H + A1HZ^{-1}}{1 + B1HZ^{-1}}$$

(T : SAMPLING TIME)

$$H(S) = \frac{V_{OUT}}{V_{IN}} = \frac{1}{1 + S \times C_2 \times R_2}$$

$$H(Z) = \frac{\dfrac{\dfrac{1}{C_2 \times R_2}}{\dfrac{1}{C_2 \times R_2} + \dfrac{2}{T}} + \dfrac{\dfrac{1}{C_2 \times R_2}}{\dfrac{1}{C_2 \times R_2} + \dfrac{2}{T}} Z^{-1}}{1 + \dfrac{\dfrac{1}{C_2 \times R_2} - \dfrac{2}{T}}{\dfrac{1}{C_2 \times R_2} + \dfrac{2}{T}} Z^{-1}} = \frac{ADT + A1TZ^{-1}}{1 + B1TZ^{-1}}$$

(T : SAMPLING TIME)

ion of the present invention relates to an improvement in image stabilizing apparatus and image blur detection system which detects the amount of vibration of a camera with respect to the absolute space and drives a correction optical system in accordance with the output thereof to prevent hand vibration at the time of taking a picture.

IMAGE BLUR PREVENTION APPARATUS WITH REWRITABLE MEMORY FOR STORING IMAGE BLUR RESPONSE

This is a continuation application under 37 CFR 1.62 of prior application Ser. No. 07/888,983, which was filed on May 26, 1992(abandoned).

BACKGROUND OF THE INVENTION

1. Field of the Invention

The present invention relates to an improvement in image stabilizing apparatus and image blur detection system which detects the amount of vibration of a camera with respect to the absolute space and drives a correction optical system in accordance with the output thereof to prevent hand vibration at the time of taking a picture.

2. Related Background Art

In a known apparatus of this type, the amount of angular displacement with respect to the absolute space has been detected using an angular displacement sensor, such as disclosed in U.S. Ser. No. 619,906 (filed on Nov. 28, 1990), which is adapted to use inertia of a liquid and control the current to be conducted to a coil in a magnetic field. Hand vibration by a photographer is prevented in accordance with the output from the angular displacement sensor such that a variable vertical angle prism using refractive index of such liquid as disclosed in Japanese Patent Laid-Open Application No.2-59718 is attached to the front surface of the taking lens, or that, as disclosed in U.S. Ser. No. 626,985 (filed on Dec. 13, 1990), the so-called shift optical system which is driven to shift a portion of a taking lens in an up and down and a left and right directions.

Of the characteristics of the correction optical system to be used in the conventional example as described, the frequency characteristic differs, however, by each individual unit due to variance in the processing accuracy and attaching precision of the mechanical components thereof. There have thus been such problems as that, when each system is closed under the same condition to perform feedback control, a vibration of the system as a whole may occur or that control characteristic may be worsened as the effect of friction is large due to reduction in loop gain.

Further, with respect to the angular displacement sensor to be used as the vibration detection means, the frequency characteristic thereof is conventionally determined such that an electric current is conducted through a coil positioned in magnetic field formed by a floating body magnetized in a certain direction and a yoke, so as to vary the conducted current in accordance with the relative angular displacement output to be detected.

Therefore, the characteristic of each individual angular displacement sensor is caused to vary largely by such variances as of the strength of the magnetic field of the magnetized floating body, the accuracy in the processed size of yoke and floating body, the attaching precision of the coil, and the current value of the coil. There has thus been a problem that, if nothing is done, it is very difficult to maintain the stabilizing characteristic of each of the mass-produced cameras at its optimal state.

SUMMARY OF THE INVENTION

In one aspect of the present invention, a nonvolatile memory device for storing data to compensate for the operation of a correction optical system is provided and the operation of said correction optical system is executed by using output data from said nonvolatile memory device, whereby it is possible to electrically correct the variance in performance of each mass-produced image stabilizing apparatus.

Further, in another aspect of the present invention, a nonvolatile memory device for storing data to correct the output of displacement detection means is provided, whereby it is possible to electrically correct the variance in performance of each mass-produced image blur detection system.

BRIEF DESCRIPTION OF THE DRAWINGS

FIG. 3 is a flowchart showing the operation of the main portion in a second embodiment of the present invention;

FIG. 4 shows a phase lead compensation circuit and transfer characteristic thereof in the second embodiment of the present invention;

DETAILED DESCRIPTION OF THE PREFERRED EMBODIMENTS

Figure 1:
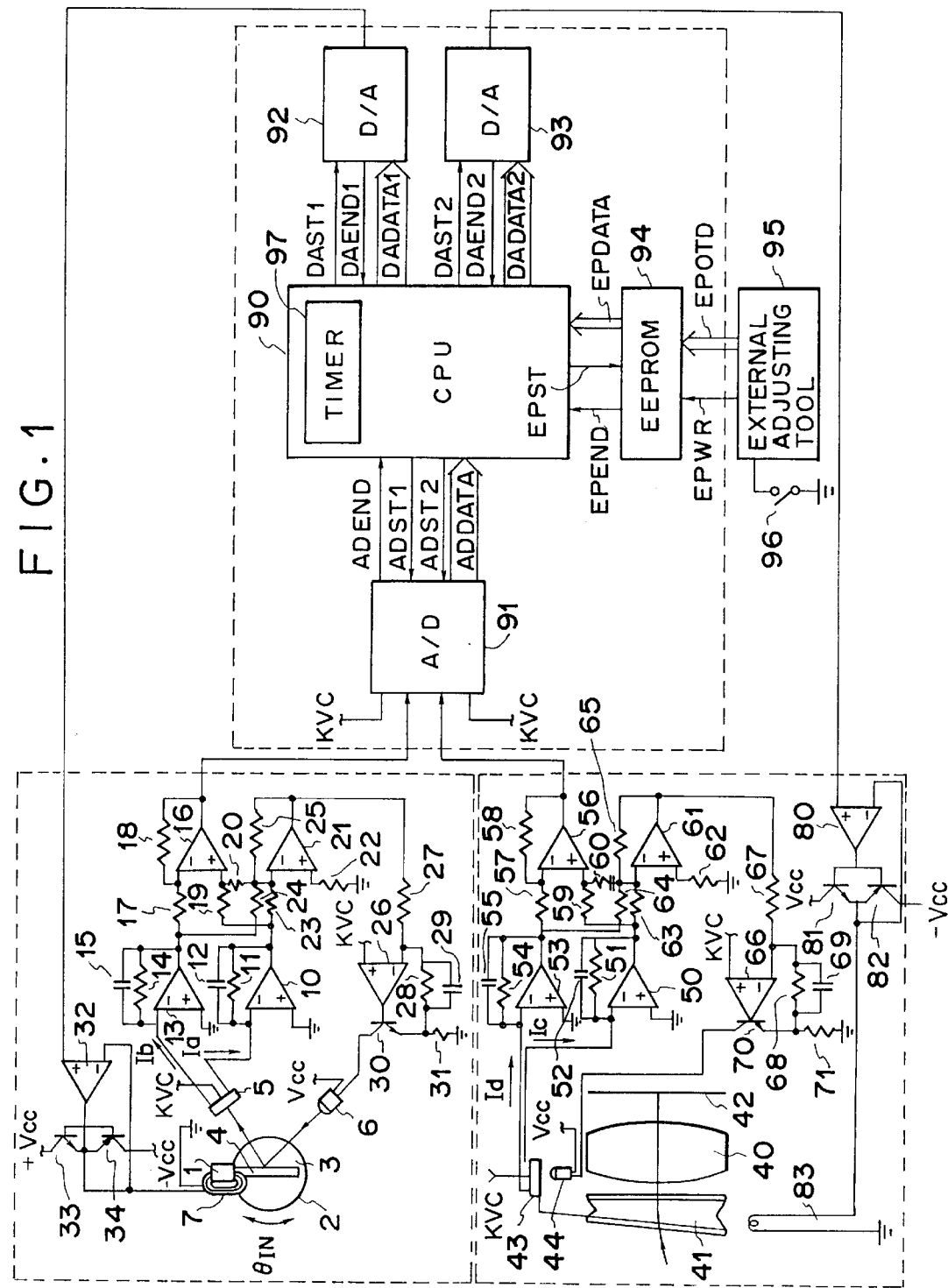
FIG. 1 illustrates the entire portion of a first embodiment according to the present invention.

The present invention will now be described in detail by way of some specific embodiments as shown in the drawings.

FIG. 1 illustrates a first embodiment of the present invention. Referring to FIG. 1, a cylindrical outer barrel 2 is filled with a liquid 3, and a floating body 4 rotatable about a predetermined rotation axis is provided within the liquid 3. Note that the floating body 4 is constituted by a permanent magnet magnetized in a predetermined axial direction. A wound coil 7 is arranged as shown in the figure between the floating body 4 and a yoke 1 provided, forming a closed magnetic circuit.

Suppose that, in this configuration, the outer barrel 2 moving integrally with the camera is rotated as a result of hand vibration by θIN with respect to the absolute space. Since the internally located floating body 4 maintains its static state with respect to the absolute space due to the inertia of the liquid 3, the floating body 4 may be regarded as rotated in relation to the outer barrel 2. It is thus possible to detect the amount of such relative displacement by a hand vibration detection means having a floodlight element 6 and a light receiving element 5 which are integrally moved with the camera.

Specifically, the signal light emitted from the floodlight element 6 is reflected at the surface of the floating body 4 to be incident upon the light receiving element 5. As a result, since the incident position of the reflected signal light onto the light receiving element 5 is changed when the floating body 4 is rotated with respect to the outer barrel 2, the output currents Ia and Ib of the light receiving element 5 are caused to vary by the movement of the floating body 4. The output currents Ia and Ib are amplified by a current-voltage conversion circuit which is constituted by an operation amplifier 10, a resistor 11 and a capacitor 12, and a current-voltage conversion circuit which is constituted by an operation amplifier 13, a resistor 14 and a capacitor 15. Their respective outputs are fed into an adder circuit constituted by an operation amplifier 21 and resistors 22, 23, 24, 25, and into a subtracter circuit constituted by an operation amplifier 16 and resistors 17, 18, 19, 20. The output of said adder circuit is fed into iRED driver circuit which is constituted by an operation amplifier 26, resistors 27, 28, 31, a capacitor 29, and a transistor 30, whereby a feedback control is effected so as to equalize the output of the adder circuit to the reference voltage KVC.

On the other hand, a position detection means for detecting angular displacement of a variable vertical angle prism 41 used as the correction optical system detects the angular displacement in exactly the same manner as the hand vibration detection means. In other words, a slit interlocked in movement with the variable vertical angle prism 41 is provided between a floodlight element 44 and a light receiving element 43 so that photoelectric currents resulting from the light receiving element 43 due to the movement of the slit are generated as Ic, Id. The output currents Ic and Id are amplified by a current-voltage conversion circuit which is constituted by an operation amplifier 50, a resistor 51 and a capacitor 52, and a current-voltage conversion circuit which is constituted by an operation amplifier 53, a register 54 and capacitors. Their respecive outputs are fed into a subtracter circuit formed of an operation amplifier 56, resistors 57, 58, 59, 60 and into an adder circuit formed of an operation amplifier 61, resistors 62, 63, 64, 65 in a similar manner as that described above. Since the output of the adder circuit is fed into iRED driver circuit which is formed by an operation amplifier 66, resistors 67, 68, 71, a capacitor 69, and transistor 70, a feedback control is effected with respect to the output of the adder circuit so that it is equal to a reference voltage KVC at all times.

Thus, the output of the operation amplifier 16 represents the vibration displacement amount with respect to the absolute space and the output of the operation amplifier 56 represents the displacement amount of the vertical angle of the variable vertical angle prism. Both of their outputs are input to an A/D converter 91 and, after their conversion into digital data, a predetermined operation is performed at CPU 90.

For control of angular displacement sensor, the result calculated on the basis of vibration displacement amount at CPU 90 is converted into an analog value through a D/A converter 92. The output thereof is input to a coil driver formed by an operation amplifier 32, and transistors 33, 34 and a current is conducted to a wound coil 7 to effect control of the angular displacement sensor itself.

On the other hand, for control of the variable vertical angle prism 41, as will be described later, correlating operation of the output of the angular displacement sensor and the displacement amount of the vertical angle of the variable vertical angle prism 41 is performed in CPU 90. Such operation result is converted into an analog value through a D/A converter 93. Then, it becomes input to a coil driver formed by an operation amplifier 80, with transistors 81, 82 to conduct a current to a wound coil 83. Thereby, displacement drive of the vertical angle of a variable vertical angle prism is effected.

Further, a sampling internal timer 97 for executing the above described operation at fixed time intervals is incorporated into CPU 90 and an EEPROM 94 which is a nonvolatile memory for adjusting the characteristic of each correction optical system is connected to CPU 90 and to an external adjusting tool 95.

Figure 2:
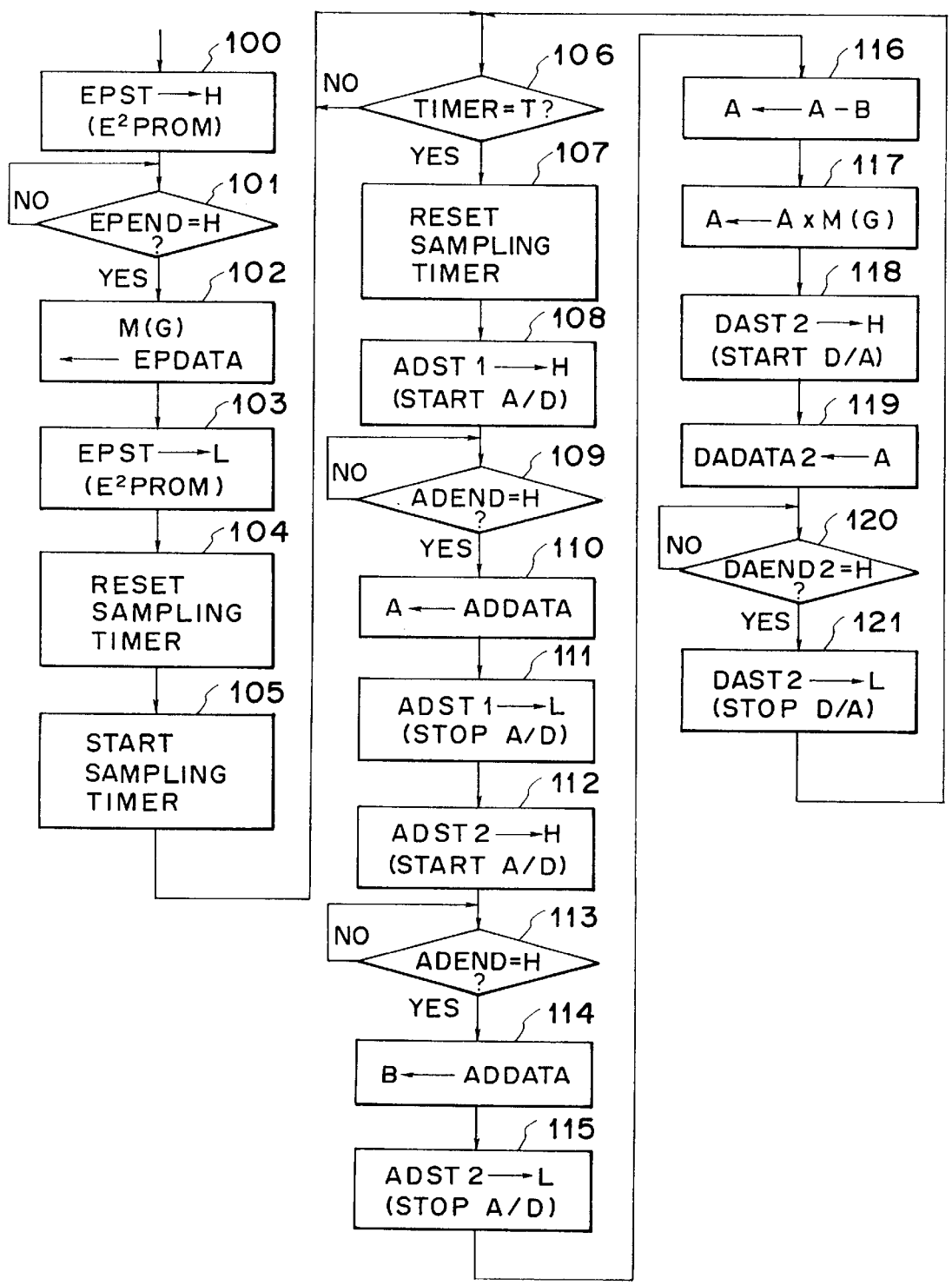
FIG. 2 is a flowchart showing the operation of the main portion in the first embodiment of the present invention.

Control using the EEPROM 94, a nonvolatile memory, will now be described with reference to the flowchart of FIG. 2.

Here, it is supposed that an output signal EPWR is set to its high logic level by the ON state of a write start switch 96 associated with the external adjusting tool 95 and that parameters (correction data) suitable for control of each individual correction optical system is previously written to EEPROM 94 by means of an output signal EPOTD.

[Step 100] After the operation of a reset circuit (not shown), the output signal EPST of CPU 90 is driven high to start read operation of data in the EEPROM 94.

[Step 101] The system waits until the output signal EPEND of the EEPROM 94 attains "H" level and proceeds to Step 102 upon attainment of "H" level.

[Step 102] The data EPDATA in the EEPROM 94 is read into CPU 90 and is set in memory M(G).

[Step 103] The output signal EPST of CPU 90 is driven low to terminate read operation of data from the EEPROM 94.

[Step 104] Reset operation is effected of a sampling timer 97 adapted to operate at fixed time intervals for performing control of the correction optical system in a digitized manner.

[Step 105] The above described sampling timer 97 is started.

[Step 106] A judgment is made as to whether the value in the sampling timer 97 has reached a predetermined time period T and the system proceeds to Step 107 upon an elapse of a predetermined time period.

[Step 107] Reset operation of the sampling timer 97 for executing the next sampling is performed.

[Step 108] The output signal ADST1 of CPU 90 is driven high to start A/D conversion operation by A/D converter 91, whereby analog output (Va–Vb) of angular displacement sensor is converted into a digital value.

[Step 109] It is seen whether the output signal ADEND of A/D converter 91 has been driven high, and the system proceeds to Step 110 upon attainment of high logic level.

[Step 110] The digital data ADDATA converted by an A/D converter 91 is read into "A" register in CPU 90.

[Step 111] The output signal of ADST1 of CPU 90 is driven low to terminate the operation of the converter 91.

[Step 112] At this time, the output signal ADST2 of CPU 90 is driven high so as to start A/D conversion operation by A/D converter 91, and the analog output of the correction optical system (the variable vertical angle prism 41) is converted to a digital value.

[Step 113] A judgment is made as to whether the output signal ADEND of A/D converter 91 has attained "H" level, and the system proceeds to Step 114 upon attainment of "H" level.

[Step 114] The digital data ADDATA converted by A/D converter 91 is read into "B" register in CPU 90.

[Step 115] The output signal ADST2 of CPU 90 is driven low to terminate the operation of A/D converter 91.
[Step 116] The value in "B" register is subtracted from the value in the above described "A" register and the difference between the output value of angular displacement sensor and the vertical angle output value of the variable vertical angle prism is set to "A" register.
[Step 117] The value of memory M(G) in which correction data for setting a loop gain as operation control of the correction optical system is set and the value of "A" register are multiplied and are set to "A" register again.
[Step 118] The output signal DAST2 of CPU 90 is driven high to start D/A conversion operation by D/A converter 93.
[Step 119] The content DADATA2 in "A" register is transferred to D/A converter 93.
[Step 120] It is seen whether the output signal DAEND2 of D/A converter 93 has attained "H" level, and the system proceeds to Step 121 upon attainment of "H" level.
[Step 121] The output signal DAST2 of CPU 90 is set low to terminate the operation of D/A converter 93.

As has been described, an operation based on the correction data in EEPROM 94 is performed with respect to the output of angular displacement sensor obtained through A/D converter 91 and vertical angle output of the variable vertical angle output prism 41. Since, on the basis of such result, an electric current is conducted to the wound coil 83 by way of D/A converter 93 and operation amplifier 80, and transistors 81, 82, it is possible to eliminate the variance in the drive characteristic of each individual correction optical system (a variable vertical angle prism 41 in this embodiment).

FIG. 3 and FIG. 4 show a second embodiment of the present invention.

A description of operation will now be given in accordance with the flowchart as shown in FIG. 3. It is to be supposed in a similar manner as the first embodiment that an individual data according to each individual correction optical system is previously written to EEPROM 94 by an external adjusting tool 95.

[Step 200] After the operation of a reset circuit (not shown), the output signal EPST of CPU 90 is driven high to start read operation of data in the EEPROM 94.
[Step 201] The system waits until the output signal EPEND of the EEPROM 94 attains "H" level and proceeds to Step 202 upon attainment of "H" level.
[Step 202] Data EPDATA1 in the EEPROM 94 is read into CPU 90 and is set in memory M(A0C).
[Step 203] Data EPDATA2 in the EEPROM 94 is read into CPU 90 and is set in memory M(A1C).
[Step 204] Data EPDATA3 in the EEPROM 94 is read into CPU 90 and is set in memory M(B1C).

Here, the above described data EPDATA1~EPDATA3 are the coefficients at the time of executing digital control by known S-Z conversion on the basis of transfer characteristics of a phase lead compensation circuit as shown in FIG. 4. If sampling time interval is T, each of the coefficients is expressed as:

$$A0C = \frac{\frac{1}{C1 \times R1} + \frac{2}{T}}{\frac{R1+R2}{C1 \times R1 \times R2} + \frac{2}{T}} \quad (1)$$

$$A1C = \frac{\frac{1}{C1 \times R1} - \frac{2}{T}}{\frac{R1+R2}{C1 \times R1 \times R2} + \frac{2}{T}} \quad (2)$$

$$BIC = \frac{\frac{R1+R2}{C1 \times R1 \times R2} - \frac{2}{T}}{\frac{R1+R2}{C1 \times R1 \times R2} + \frac{2}{T}} \quad (3)$$

[Step 205] An internal register M (WC) for digital operation to be described later is set to "0".
[Step 206] The output signal EPST of CPU 90 is driven low to terminate read out operation of data from EEPROM 94.
[Step 207] Reset operation is performed of a sampling timer 97 which is operated at regular time intervals for performing control of the correction optical system in a digitized manner.
[Step 208] The above described sampling timer 97 is started.
[Step 209] A judgement is made as to whether the value in the sampling timer 97 has reached a predetermined time period T and the system proceeds to Step 210 upon elapse of time period T.
[Step 210] Reset operation of the sampling timer 97 is performed to effect the next sampling.
[Step 211] The output signal ADST1 of CPU 90 is driven high to start A/D conversion operation by A/D converter 91, whereby analog output (Va–Vb) of angular displacement sensor is converted into a digital value.
[Step 212] It is seen whether the output signal ADEND of A/D converter 91 has been driven high, and the system proceeds to Step 213 upon attainment of high logic level.
[Step 213] Digital data ADDATA converted by A/D converter 91 is read into "A" register in CPU 90.
[Step 214] The output signal ADST1 of CPU 90 is driven low to terminate the operation of A/D converter 91.
[Step 215] At this time, the output signal ADST2 of CPU 90 is driven high to start A/D conversion operation by A/D converter 91, whereby the analog output of correction optical system is converted into a digital value.
[Step 216] It is seen whether the output signal ADEND of A/D converter 91 has been driven low, and the system proceeds to Step 217 upon attainment of high logic level.
[Step 217] Digital data ADDATA converted by A/D converter 91 is read into "B" register in CPU 90.
[Step 218] The output signal ADST2 of CPU 90 is driven low to terminate the operation of A/D converter 91.
[Step 219] The value in "B" register is subtracted from the value in the above described "A" register and the difference between the output value of the angular displacement sensor and the vertical angle output value of the variable vertical angle prism is set to "A" register.
[Step 220] In order to execute digital phase compensation operation as described above, the respective values of memory M(B1C) and M(WC) are multiplied, and the result of which is subtracted from the value in "A" register to be set to "C" register.
[Step 221] The respective values of memory M (A0C) and "C" register are multiplied, and the result of which is added to the multiplied result of the respective values of memory M(A1C) and M(WC) to be set to "D" register.
[Step 222] The value in the above described "C" register is set to memory M (WC) to terminate operation for phase compensation.
[Step 223] The output signal DAST2 of CPU 90 is driven high to start D/A conversion operation by D/A converter 93.
[Step 224] The content DADATA2 in "D" register is transferred to D/A converter 93.
[Step 225] It is seen whether the output signal DAEND2 of D/A converter 93 has been driven high, and the system proceeds to Step 226 upon attainment of high logic level.

[Step 226] The output signal DAST2 of CPU 90 is driven low to terminate the operation of D/A converter 93.

As has been described, the operation of phase compensation is performed on the basis of coefficients set by data in EEPROM 94 with respect to the difference between angular displacement output and vertical angle output of variable vertical angle prism which are obtained through A/D converter 91. Thus, an optimal control is effected to each individual correction optical system.

Figure 5:
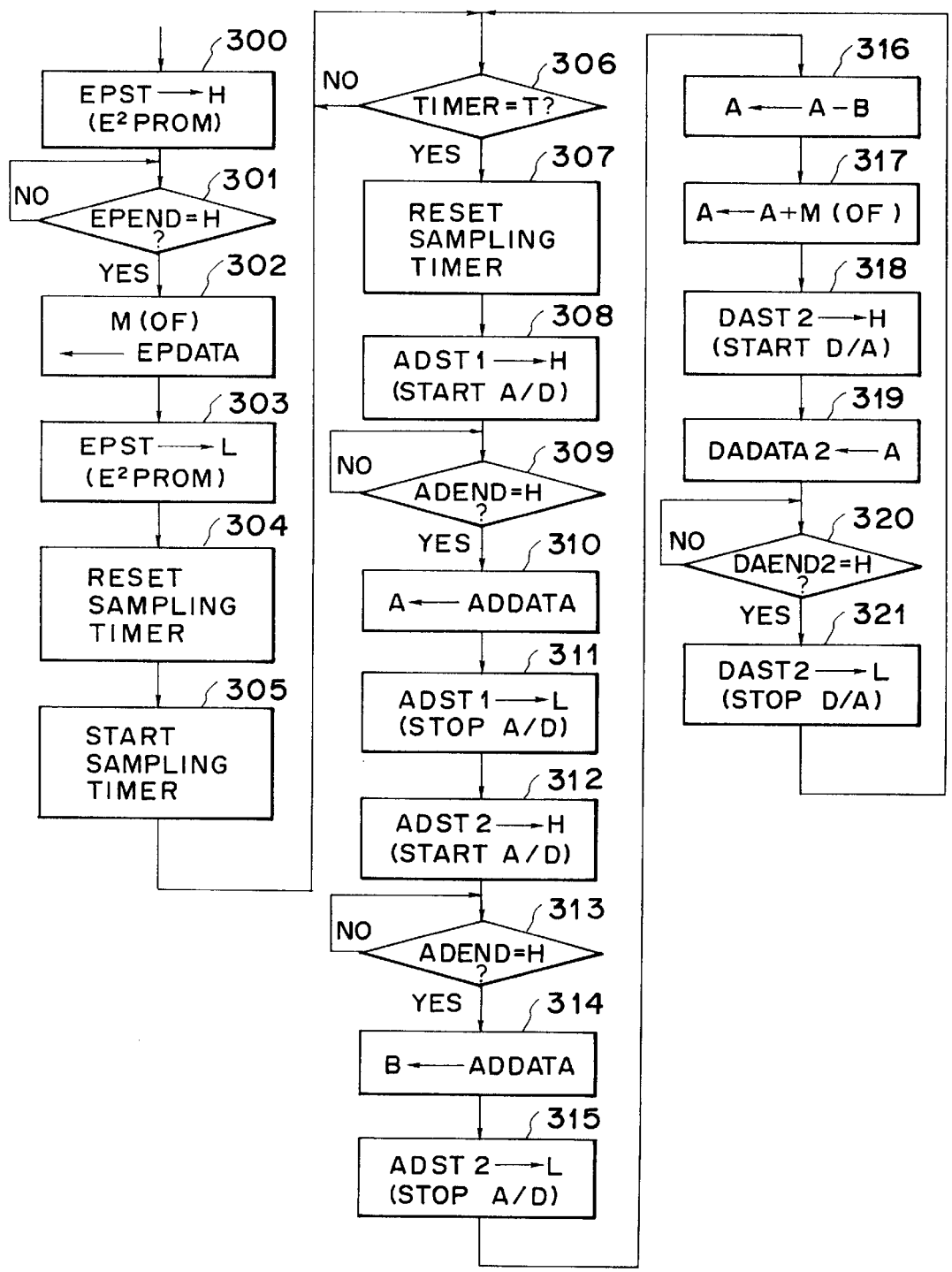
FIG. 5 is a flowchart showing the operation of the main portion in a third embodiment of the present invention.

FIG. 5 is a flowchart illustrating the operation in a third embodiment of the present invention and a description thereof will be given below. It is to be supposed in a similar manner as the first and second embodiments that an individual data according to each correction optical system is previously written to EEPROM 94 by an external adjusting tool 95.

[Step 300] After the operation of a reset circuit (not shown), the output signal EPST of CPU 90 is driven high to start read operation of data in the EEPROM 94.

[Step 301] The system waits until the output signal EPEND of the EEPROM 94 attains "H" level and proceeds to Step 302 upon attainment of "H" level.

[Step 302] EPDATA for offset correction of each correction optical system in the EEPROM 94 is read into CPU 90 and set to memory M (0F).

[Step 303] The output signal EPST of CPU 90 is driven low to terminate read out operation of data from the EEPROM 94.

[Step 304] Reset operation is performed of a sampling timer 97 which is operated at regular time intervals for performing control of the correction optical system in a digitized manner.

[Step 305] The above described sampling timer 97 is started.

[Step 306] A judgement is made as to whether the value in the sampling timer 97 has reached a predetermined time period T and the system proceeds to Step 307 upon elapse of time period T.

[Step 307] Reset operation of the sampling timer 97 is performed to effect the next sampling.

[Step 308] The output signal ADST1 of CPU 90 is driven high to start A/D conversion operation by A/D converter 91, whereby analog output (Va−Vb) of angular displacement sensor is converted into a digital value.

[Step 309] It is seen whether the output signal ADEND of A/D converter 91 has been driven high, and the system proceeds to Step 310 upon attainment of high logic level.

[Step 310] Digital data ADDATA converted by A/D converter 91 is read into "A" register in CPU 90.

[Step 311] The output signal ADST1 of CPU 90 is driven low to terminate the operation of A/D converter 91.

[Step 312] At this time, the output signal ADST2 of CPU 90 is driven high to start A/D conversion operation by A/D converter 91, whereby the analog output of correction optical system (variable vertical angle prism 41) is converted into a digital value.

[Step 313] It is seen whether the output signal ADEND of A/D converter 91 has been driven high, and the system proceeds to Step 314 upon attainment of high logic level.

[Step 314] Digital data ADDATA converted by A/D converter 91 is read into "B" register in CPU 90.

[Step 315] The output signal ADST2 of CPU 90 is driven low to terminate the operation of A/D converter 91.

[Step 316] The value in "B" register is subtracted from the value in the above described "A" register and the difference between the output value of the angular displacement sensor and the vertical angle output value of the variable vertical angle prism is set to "A" register.

[Step 317] The respective values of memory M (0F) in which data for offset correction of each individual correction optical system is set and of "A" register are multiplied with each other and the result is set to "A" register again.

[Step 318] The output signal DAST2 of CPU 90 is driven high to start D/A conversion operation by D/A converter 93.

[Step 319] The content DADATA2 in "A" register is transferred to D/A converter 93.

[Step 320] It is seen whether the output signal DAEND2 of D/A converter 93 has been driven high, and the system proceeds to Step 321 upon attainment of high logic level.

[Step 321] The output signal DAST2 of CPU 90 is driven low to terminate the operation of D/A converter 93.

As has been described, an offset value set by data in EEPROM 94 is added to the difference between angular displacement output and vertical angle output of variable vertical angle prism obtained through A/D converter 91. The amount of shift of center point of a correction optical system occurring due to such effect as of gravity may thus be corrected with respect to each individual unit.

In the above described embodiments, control of a correction optical system is effected by digital operation and the parameters in such operation is set by data (such data as of loop gain, phase compensation, and offset for executing feedback control) from a nonvolatile memory (EEPROM 94) connected to CPU 90. There are thus such advantages as that variance in the characteristics of correction optical system according to each individual unit may be corrected and that control characteristic may be varied at will.

Figure 6:
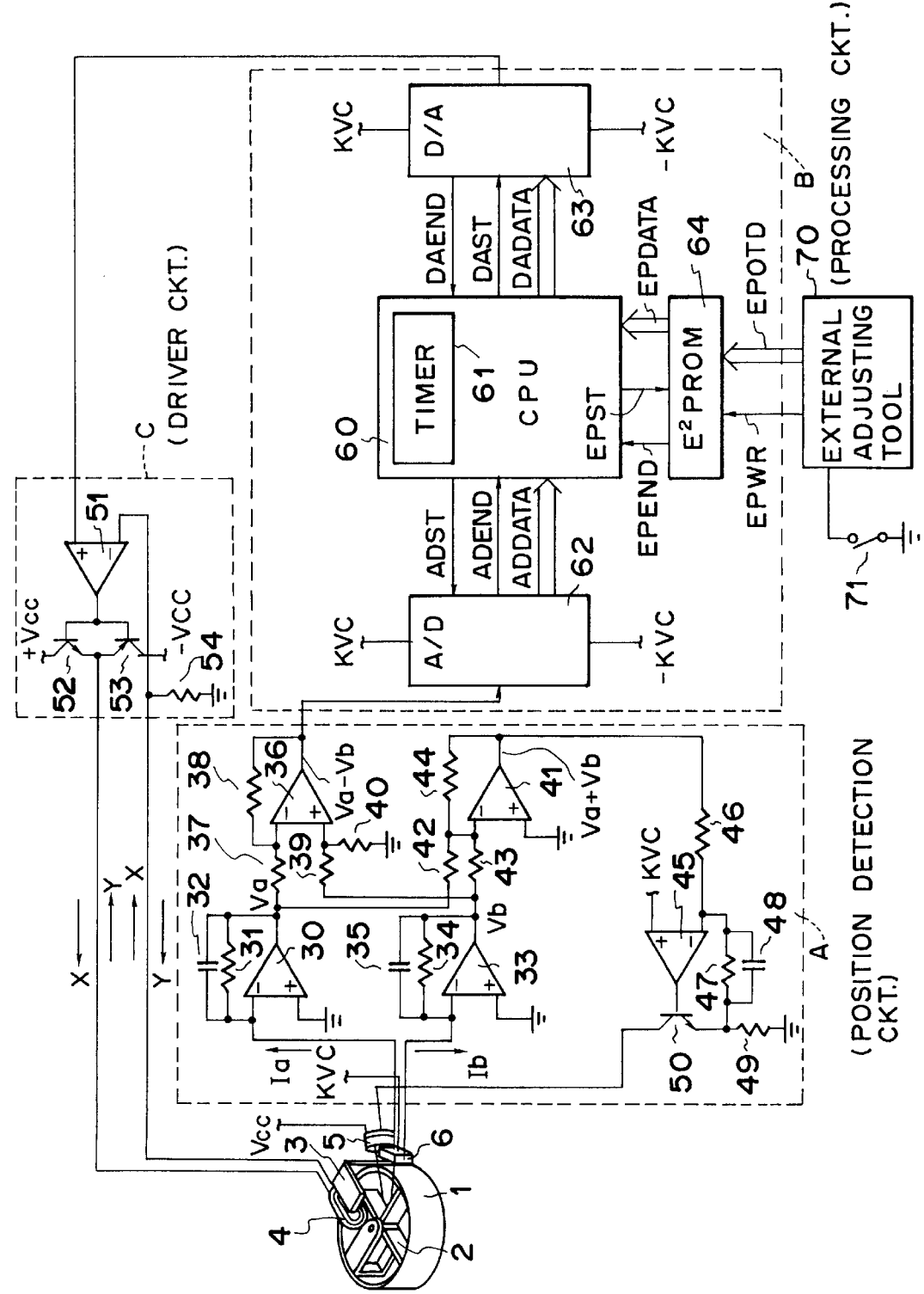
FIG. 6 illustrates an angular displacement sensor and a control circuit thereof according to a fourth embodiment of the present invention.

FIG. 6 illustrates the construction of angular displacement sensor and control circuit thereof according to a fourth embodiment of the present invention.

The portion A surrounded by a broken line in FIG. 6 represents a position detection circuit for detecting the position of a floating body 2 with respect to an outer barrel (case) 1, and it is fundamentally constructed such that a reflected light of infrared radiation originating from a light emitting element and reflected at the floating body 2 is detected by a position detecting light receiving element 6. The photoelectric currents Ia, Ib generated at the light receiving element 6 are shunted in a known manner in accordance with the centroid of the infrared radiation incident upon the light receiving element 6. They are converted into voltages Va, Vb, respectively, by a current-voltage conversion circuit which is formed by an operation amplifier 30, a resistor 31 and a capacitor 32, and another current-voltage conversion circuit which is formed by an operation amplifier 33, a resistor 34 and a capacitor 35. The voltages Va, Vb are then fed into a differential amplifier which is formed by an operation amplifier 36 and resistors 37, 38, 39, 40 and from which they are output as a difference signal represented as (Va−Vb). They are also fed into an adding amplifier which is formed by an operation amplifier 41 and resistors 42, 43, and 44 and from which they are output as a sum signal represented as (Va+Vb).

The above described sum signal (Va+Vb) is connected to an inverted input terminal of an operation amplifier 45 by way of a resistor 46. A constant current type iRED driver circuit which is formed by an operation amplifier 45, a feedback resistor 47, a current value detecting resistor 49 and a transistor 50, therefore, causes to vary the conducted current to the light emitting element 5 in accordance with the sum signal (Va+Vb). Control of negative feedback is effected such that the resulting sum signal (Va+Vb) equals the reference voltage KVC which is connected to non-inverted input terminal of the operation amplifier 45. Note that the capacitor 48 is a phase compensating capacitor for preventing an oscillation of the feedback system and is combined with the resistor 47 to determine the bandwidth of the whole.

In the manner as described above, by keeping constant at all times photoelectric current generated at the light receiving element, the difference signal (Va–Vb) of the two outputs of the light receiving element 6 represents correctly at all times the relative position of the outer barrel and the floating body 2 without being affected by change in temperature or variance in elements.

Portion "B" surrounded by a broken line in FIG. 6 represents a processing circuit for controlling in a digitized manner an angular displacement sensor to be used in the present invention.

The difference signal (Va–Vb), the output of the above described angular displacement sensor, is converted into a digital signal at an A/D converter 62. Such digital signal is subjected to an operation processing in CPU 60. It is then converted into an analog data again at a D/A converter 63 and is output to a driver circuit (Portion "C" surrounded by a broken line) which will be described later. Note that a sampling timer 61 for performing the above described operation at fixed time intervals is incorporated into CPU 60 and that an EEPROM 64, a nonvolatile memory for storing data to adjust the characteristics of each individual angular displacement sensor, is connected to an external adjusting tool 70.

Portion "C" surrounded by a broken line in FIG. 6 is a driver circuit for actually driving the wound coil 4. A push-pull type constant current circuit is constituted by an operation amplifier 51, transistors 52, 53 and current detecting resistor 54. It is possible to conduct a current in both of X and Y directions as shown by arrows in FIG. 1. Thus, a current proportional to the output voltage of the D/A converter 63 applied to the non-inverted input terminal of the operation amplifier 51 is conducted to the wound coil 4.

With the above described circuit configuration, a current proportional to the difference signal (Va–Vb), a relative position signal of the outer barrel 1 and the floating body 2, is conducted to the wound coil 4, whereby a force based on Fleming's left-hand rule is created within the closed magnetic circuit which is constituted by the floating body 2 and yoke 3 in the manner as described. Since this force is intrinsically proportional to the current value of the wound coil 4, the generated force is proportional to the relative value of the outer barrel 1 and the floating body 2.

Figure 7:
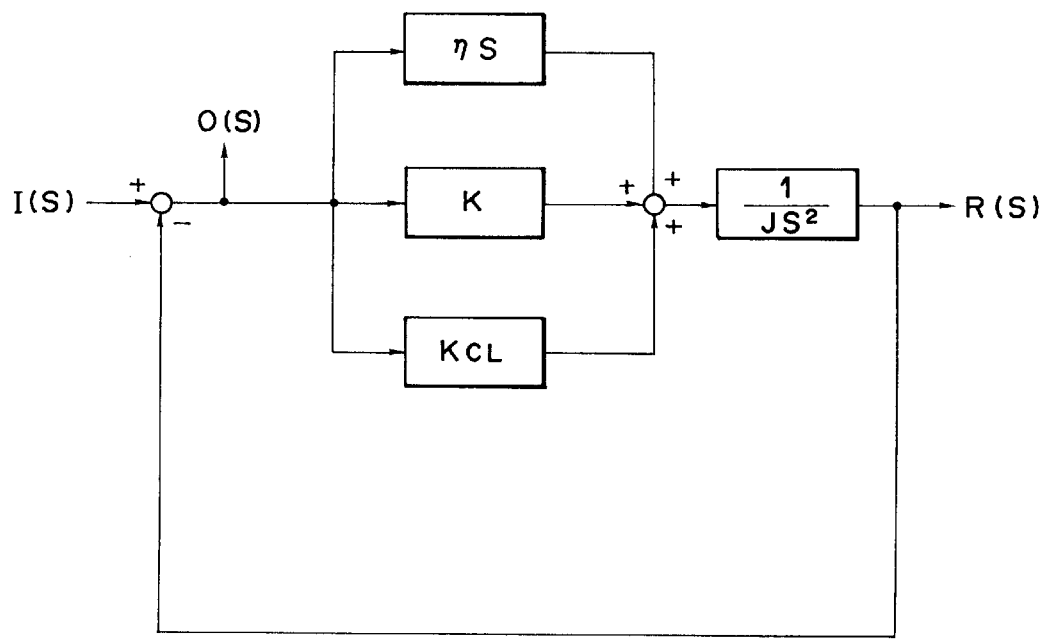
FIG. 7 is a control block diagram according to the fourth embodiment of the present invention.

The characteristic as the above described angular displacement sensor will now be described using its transfer characteristic related frequency as shown in FIG. 7.

Here, I(S), representing input, indicates the displacement of the outer barrel 1 with respect the absolute space. Since, further, the output angular displacement O(S) to be detected by the above described angular displacement sensor is detected on the basis of the relative relation between the displacement R(S) of the floating body 2 with respect to the absolute space and the input angular displacement I(S), it is represented by the following formula:

$$O(S) = I(S) - R(S) \quad (1)$$

Further, this output angular displacement O(S) is a relative angular displacement of the outer barrel 1 and the floating body 2. A viscosity force $\eta SO(S)$ proportional to the relative speed of the outer barrel 1 and the floating body 2 is caused by the viscosity of the liquid which is enclosed in the outer barrel 1. On the other hand, a spring force due to a magnetic force should not be caused in a state where no current is conducted to the wound coil 4 if the width of the yoke 3 is unlimited in extent with respect to the traveling direction of the floating body 2. Since, however, the width of the yoke 3 is in fact limited, a spring force KO(S) is also caused though it is a very weak force. Further, in the present invention, another spring force may be added by means of a force which is generated by conducting an electric current proportional to the relative displacement of the outer barrel 1 and the floating body 2 according to the method as described. Here, the spring force KCLO(S) by the wound coil 4 acts upon in a similar manner as the original spring force KO(S) and the value of spring constant KCL may be set at will, it is possible to produce a desired spring force.

Supposing that the above described forces are acting upon the floating body 2, the angular displacement R(S) of the floating body 2 with respect to the total space may be represented on the basis of the following formula using the inertia moment J of the liquid within the outer barrel 1 as:

$$R(S) = \frac{1}{JS^2}(\eta S + K + KCL)O(S) \quad (2)$$

Using the above described formulas (1), (2), the transfer characteristic of the present embodiment may be represented as:

$$\frac{O(S)}{I(S)} = \frac{JS^2}{JS^2 + \eta S + K + KCL} \quad (3)$$

Figure 8:
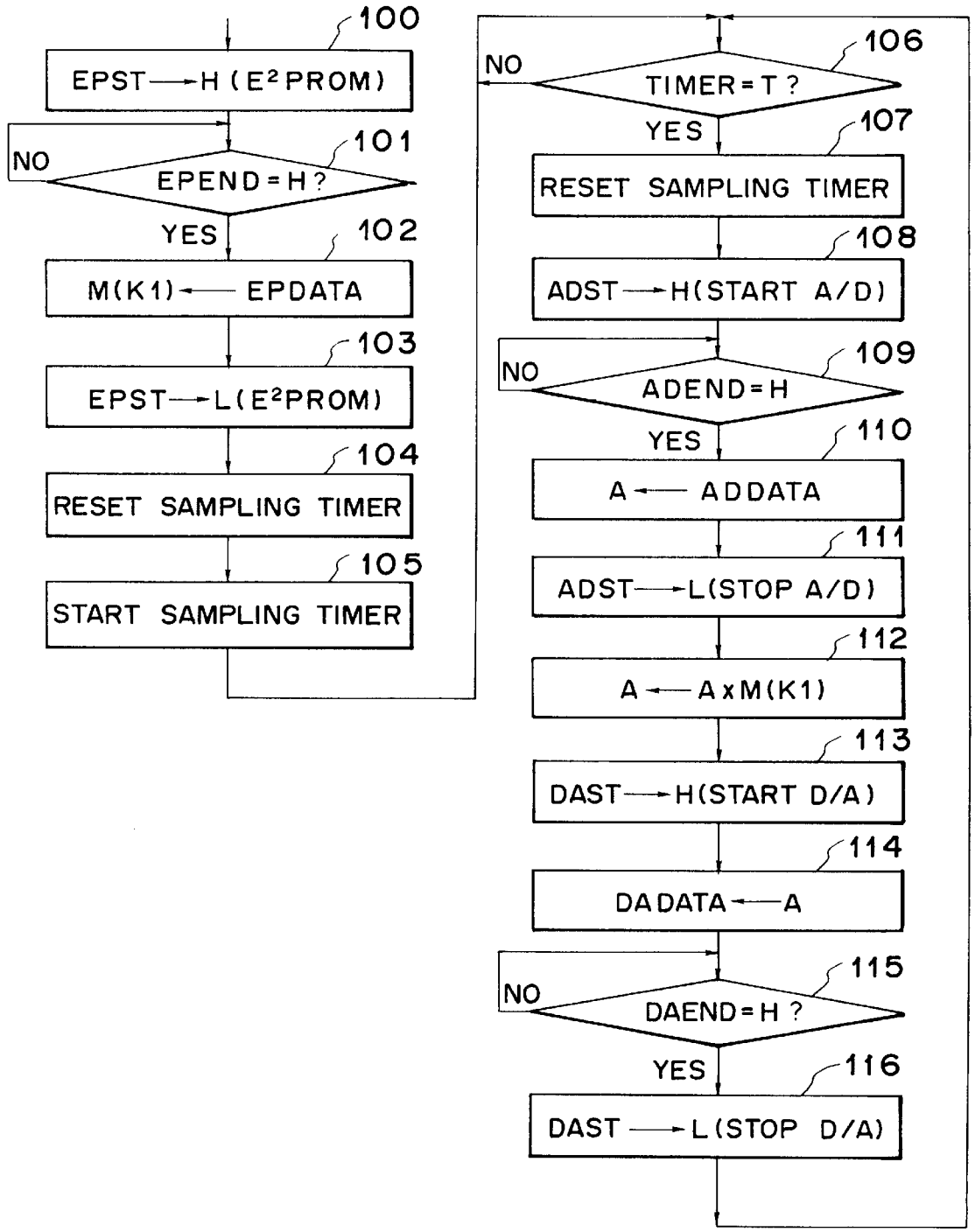
FIG. 8 is a flowchart showing the operation of the main portion according to the fourth embodiment of the present invention.

Control using EEPROM 64, a nonvolatile memory, will now be described by way of a flowchart as shown in FIG. 8.

Here, it is supposed that an output signal EPWR is driven high by the ON state of a write start switch 71 associated to the external adjusting tool 70 and that individual data according to each angular displacement sensor is previously written to EEPROM 64 by means of an output signal EPOTD.

[Step 100] After the operation of a reset circuit (not shown), the output signal EPST of CPU 60 is driven high to start read operation of data in the EEPROM 64.

[Step 101] The system waits until the output signal EPEND of the EEPROM 64 attains "H" level and proceeds to Step 102 upon attainment of high logic level.

[Step 102] The data EPDATA in the EEPROM 64 is read into CPU 60 and is set in memory M(K1).

[Step 103] The output signal EPST of CPU 60 is driven low to terminate read operation of data from the EEPROM 64.

[Step 104] Reset operation is performed of a sampling timer which is operated at fixed time intervals to control the angular displacement sensor in a digitized manner.

[Step 105] The above described sampling timer is started.

[Step 106] It is seen whether the value in the sampling timer has reached a predetermined time period T, and the system proceeds to Step 107 upon the elapse of the predetermined time period T.

[Step 107] Reset operation of sampling timer is effected to perform the next sampling.

[Step 108] The output signal ADST of CPU 60 is driven high to start A/D conversion operation by A/D converter 62, and the analog output (Va–Vb) of the angular displacement sensor is converted into a digital value.

[Step 109] It is seen whether the output signal ADEND of A/D converter 62 has been driven high, and the system proceeds to Step 110 upon attainment of "H" level.

[Step 110] The digital data ADDATA converted by A/D converter 62 is read into "A" register in CPU 60.

[Step 111] The output signal ADST of CPU 60 is driven low to terminate the operation of A/D converter 62.

[Step 112] The respective values of the internal memory M(K1) which stores data of EEPROM 64 and of the above described "A" register are multiplied, and the result thereof is set into "A" register again.

[Step 113] The output signal ADST of CPU 60 is driven high to start D/A conversion operation by D/A converter 63.

[Step 114] The content DADATA in "A" register is transferred to D/A converter 63.

[Step 115] It is seen whether the output signal DAEND of D/A converter 63 has been driven high, and the system proceeds to Step 116 upon attainment of "H" level.

[Step 116] The output signal DAST of CPU 60 is driven low to terminate the operation of D/A converter 63.

As described above, the output (Va−Vb) of the angular displacement sensor obtained through A/D converter 62 is subjected to a proportional calculation in accordance with data within EEPROM 64, and the result of which effects conducts a current to the wound coil 4 through D/A converter 63 and driver circuit "C". The spring constant in the angular displacement sensor may thus be selected at will and variance in angular displacement sensors may be eliminated.

Figure 9A:
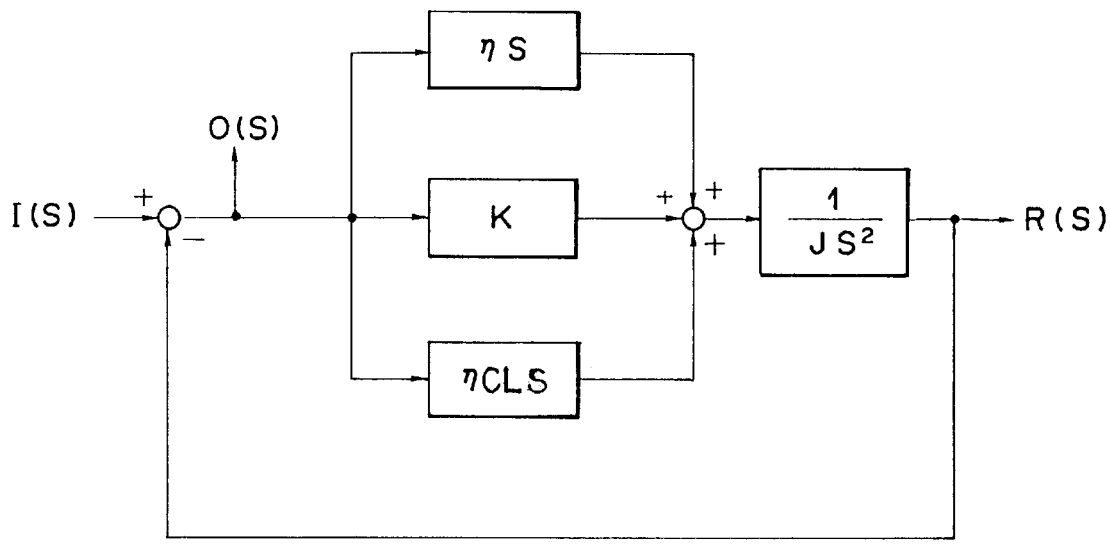
FIGS. 9A and 9B are control block diagrams according to a fifth embodiment of the present invention.
Figure 9B:
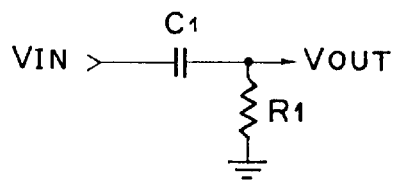
Figure 10:
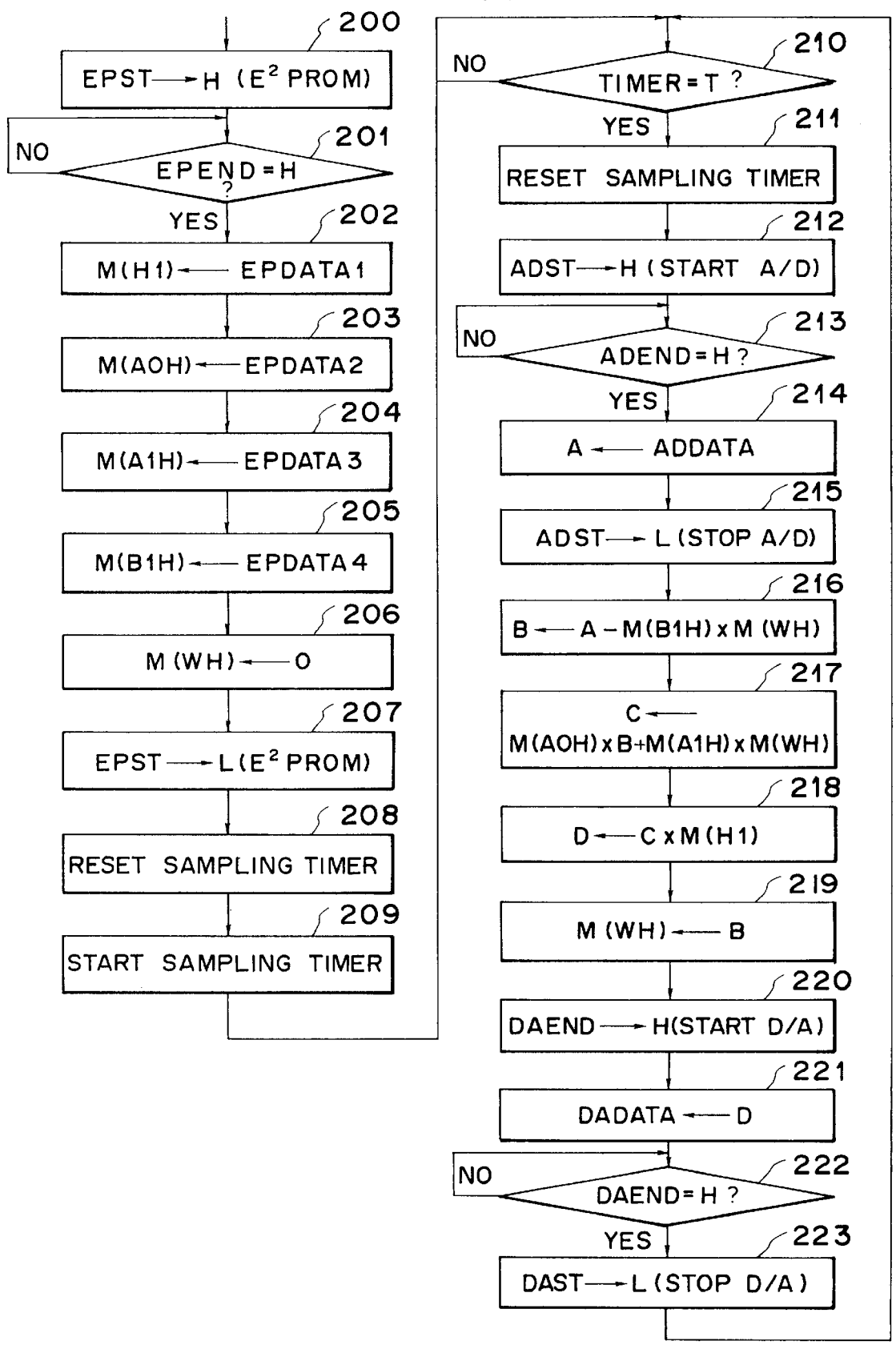
FIG. 10 is a flowchart showing the operation of the main portion according to the fifth embodiment of the present invention.

FIGS. 9A, 9B and 10 illustrate a fifth embodiment of the present invention.

FIG. 9A shows the transfer characteristic as an angular displacement sensor. A force ηCLSO(S), which is proportional to the value obtained by differentiating the relative angular displacement 0(S) of the outer barrel 1 and the floating body 2, is added thereto, so that it has a similar effect as the viscosity force by a liquid within the sensor.

Here, the overall characteristic of the present invention is represented by using the inertia moment J of a liquid in an outer barrel 1 as:

$$\frac{O(S)}{I(S)} = \frac{JS^2}{JS^2 + (\eta + \eta CL)S + K} \quad (4)$$

Further, FIG. 9B shows a differentiating circuit and the transfer characteristic thereof to be used in the present embodiment. While, in fact, the formula H(S) is of a phase lead circuit, it exhibits a differential characteristic for those frequencies which are sufficiently lower than $f=1/(2\pi \cdot C1 \cdot R1)$.

Furthermore, formula H(Z) is of calculating coefficients for executing digital control by known S-Z conversion, and, when sampling time interval is set as T, each coefficient is represented as:

$$A0H = \frac{\frac{2}{T}}{\frac{1}{C1 \times R1} + \frac{2}{T}} \quad (5)$$

$$A1H = \frac{-\frac{2}{T}}{\frac{1}{C1 \times R1} + \frac{2}{T}} \quad (6)$$

$$B1H = \frac{\frac{1}{C1 \times R1} - \frac{2}{T}}{\frac{1}{C1 \times R1} + \frac{2}{T}} \quad (7)$$

The operation of the present embodiment will now be described with reference to the flowchart as shown in FIG. 10.

In a similar manner as in the first embodiment, it is supposed that individual data according to each sensor is written to EEPROM 64 by the external adjusting tool 70.

[Step 200] After the operation of a reset circuit (not shown), the output signal EPST of CPU 60 is driven high to start read operation of data in the EEPROM 64.

[Step 201] It is seen whether the output signal EPEND of the EEPROM 64 has been driven high, and the system proceeds to Step 102 when high logic level is attained.

[Step 202] The data EPDATA1 in the EEPROM 64 is read into CPU 60 and is set in memory M(H1).

[Step 203] The data EPDATA2 in the EEPROM 64 is read into CPU 60 and is set in memory M(A0H).

[Step 204] The data EPDATA3 in the EEPROM 64 is read into CPU 60 and is set in memory M(A1H).

[Step 205] The data EPDATA4 in the EEPROM 64 is read into CPU 60 and is set in memory M(B1H).

[Step 206] An internal register M(WH) for digital operation to be described later is reset to "0".

[Step 207] The output signal EPST of CPU 60 is driven low to terminate read out operation of data from EEPROM 64.

[Step 208] A reset is performed of a sampling timer for executing control of angular displacement sensor in a digitized manner.

[Step 209] The above described sampling timer is started.

[Step 210] A judgment is made as to whether the value in the sampling timer has reached a predetermined time period T, and the system proceeds to Step 211 upon the elapse of the predetermined time period T.

[Step 211] Reset operation of sampling timer is effected to perform the next sampling.

[Step 212] The output signal ADST of CPU 60 is driven high to cause A/D converter 62 to start A/D conversion operation of the output (Va−Vb) of the angular displacement sensor.

[Step 213] It is judged whether the output signal ADEND of A/D converter 62 has been driven high, and the system proceeds to Step 214 upon attainment of "H" level.

[Step 214] The data ADDATA from A/D converter 62 is read into "A" register in CPU 60.

[Step 215] The output signal ADST of CPU 60 is driven low to terminate the operation of A/D converter 62.

[Step 216] To execute the above described digital differential operation, the respective values in the internal memories M(B1H) and M(WH) are multiplied. This result is subtracted from the value in "A" register set with the displacement output of the angular displacement sensor, and what is obtained is set to "B" register.

[Step 217] The multiplied result of the respective values in the internal memories M(A1H) and M(WH) is added to the multiplied result of the respective values in the internal memory M(A0H) and "B" register, and what is obtained is set to "C" register.

[Step 218] The value in the above described "C" register is multiplied by the value in memory M(Hl) set with the differential operation gain of the present embodiment, and what is obtained is set to "D" register.

[Step 219] The value in the above described "B" register is set to the internal memory M(WH) to terminate differential operation.

[Step 220] The output signal DAEND of D/A converter 63 is driven high to start D/A operation by D/A converter 63.

[Step 221] The content DADATA in "D" register is transferred to D/A converter 63.

[Step 222] It is judged whether the output signal DAEND of D/A converter 63 has been driven high, and the system proceeds to Step 223 upon attainment of "H" level.

[Step 223] The output signal DAST of CPU 60 is set to low to terminate the operation of D/A converter 63.

As has been described, a predetermined differential operation is executed with respect to the output value of angular displacement sensor obtained through A/D converter 62, in accordance with data in EEPROM 64. A current proportional to the result of such operation is conducted to the wound coil 4 in the angular displacement sensor. The viscosity coefficient of the angular displacement sensor may thus be selected at will by means of electricity.

Figure 11A:
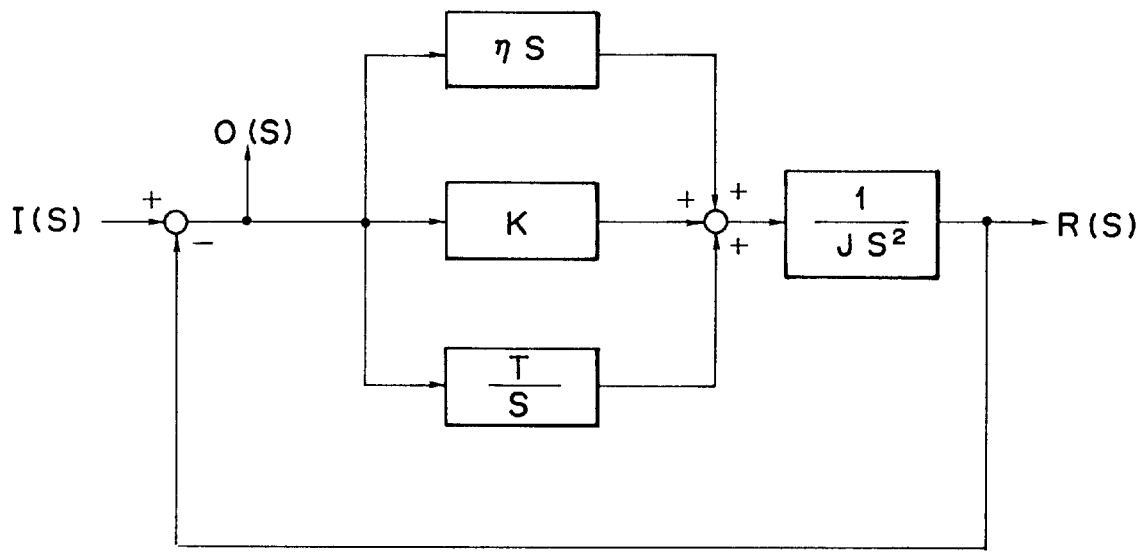
FIGS. 11A and 11B are control block diagrams according to a sixth embodiment of the present invention.
Figure 11B:
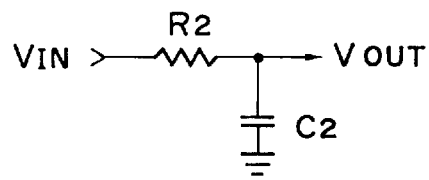
Figure 12:
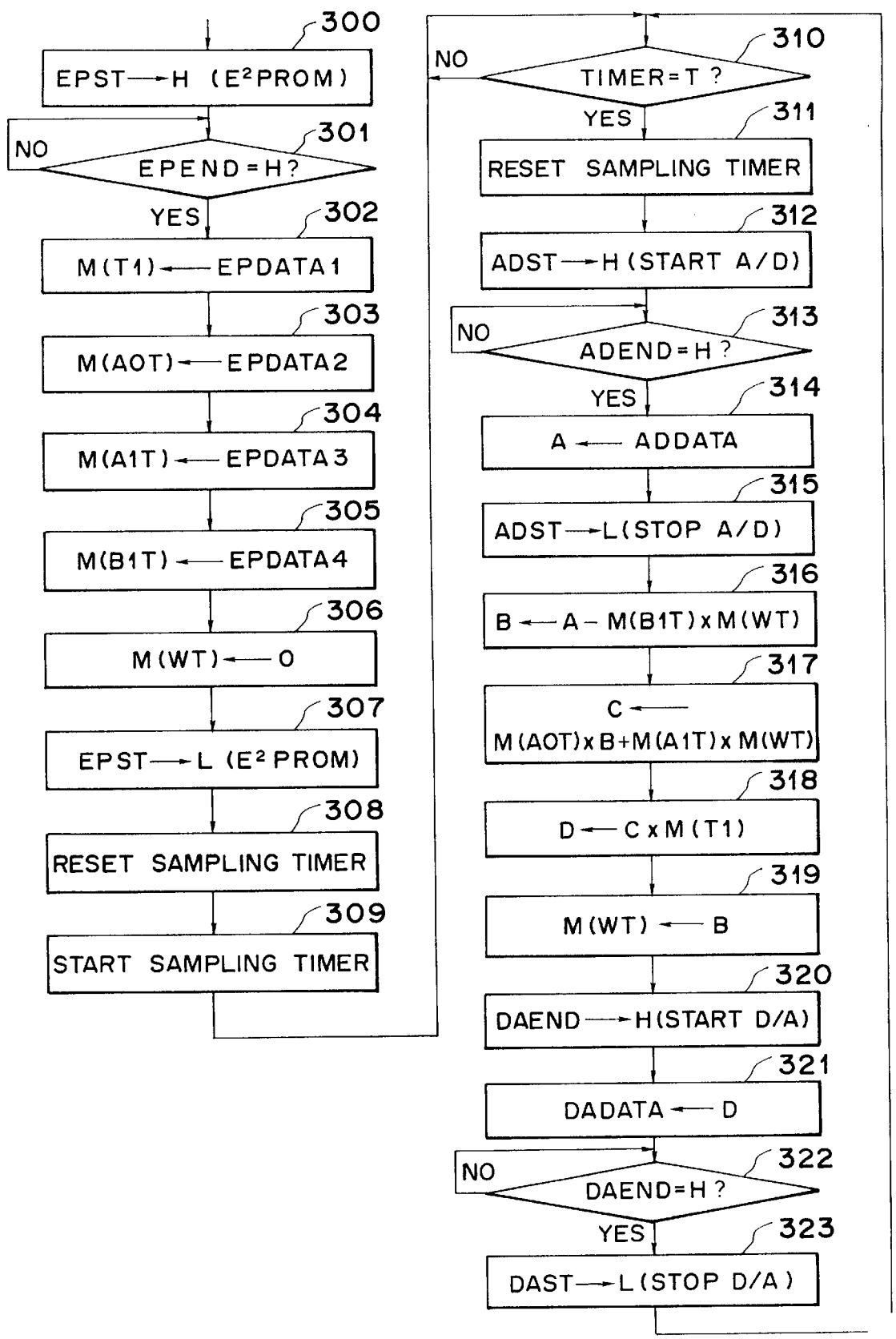
FIG. 12 is a flowchart showing the operation of the main portion according to the sixth embodiment of the present invention.

FIGS. 11 and 12 illustrate a sixth embodiment of the present invention.

FIG. 11A shows the transfer characteristic as an angular displacement sensor in a similar manner as in the fourth and fifth embodiments. A force represented as T/S·O(S) proportional to the value integrating the relative angular displacement O(S) of the outer barrel 1 and the floating body 2 is furthermore added to this configuration.

Here, the inertia moment J of the liquid within the outer barrel 1 may be used to represent the overall characteristic of the present invention as:

$$\frac{O(S)}{I(S)} = \frac{JS^2}{JS^2 + \eta S + K + \frac{T}{S}} \qquad (8)$$

Further, FIG. 11B shows the transfer characteristic of the integrating circuit to be used in the present embodiment. The transfer function represented by H(S) is in fact of a circuit of time-lag of first order, and it exhibits an integrating characteristic for those frequencies which are higher than "f=1/(2π·C2·R2)".

Furthermore, the formula represented by H(Z) is for calculating the coefficients to execute digital control by known S-Z conversion, and, the sampling time interval is set as T, the coefficients are expressed as:

$$A0T = \frac{\frac{1}{C2 \times R2}}{\frac{1}{C2 \times R2} + \frac{2}{T}} \qquad (9)$$

$$A1T = \frac{\frac{1}{C2 \times R2}}{\frac{1}{C2 \times R2} + \frac{2}{T}} \qquad (10)$$

$$B1T = \frac{\frac{1}{C2 \times R2} - \frac{2}{T}}{\frac{1}{C2 \times R2} + \frac{2}{T}} \qquad (11)$$

The operation of the present embodiment will now be described with reference to the flowchart as shown in FIG. 12.

The operation of the present embodiment will now be described with reference to the flowchart as shown in FIG. 10.

In a similar manner as in the first and second embodiments, it is supposed also in this embodiment that individual data according to each sensor is written to EEPROM 64 by the external adjusting tool 70.

[Step 300] After the operation of a reset circuit (not shown), the output signal EPST of CPU 60 is driven high to start read operation of data in the EEPROM 64.

[Step 301] It is seen whether the output signal EPEND of the EEPROM 64 has been driven high, and the system proceeds to Step 102 when high logic level is attained.

[Step 302] The data EPDATA1 in the EEPROM 64 is read into CPU 60 and is set in memory M(T1).

[Step 303] The data EPDATA2 in the EEPROM 64 is read into CPU 60 and is set in memory M(A0T).

[Step 304] The data EPDATA3 in the EEPROM 64 is read into CPU 60 and is set in memory M(A1T).

[Step 305] The data EPDATA4 in the EEPROM 64 is read into CPU 60 and is set in memory M(B1T).

[Step 306] An internal register M(WT) for digital operation to be described later is reset to "0".

[Step 307] The output signal EPST of CPU 60 is driven low to terminate read out operation of data from EEPROM 64.

[Step 308] A reset is performed of a sampling timer for executing control of angular displacement sensor in a digitized manner.

[Step 309] The above described sampling sensor is started.

[Step 310] A judgment is made as to whether the value in the sampling timer has reached a predetermined time period T, and the system proceeds to Step 311 upon the elapse of the predetermined time period T.

[Step 311] Reset operation of sampling timer is effected to perform the next sampling.

[Step 312] The output signal ADST of CPU 60 is driven high to cause A/D converter 62 to start A/D conversion operation of the output (Va–Vb) of the angular displacement sensor.

[Step 313] It is judged whether the output signal ADEND of A/D converter 62 has been driven high, and the system proceeds to Step 214 upon attainment of "H" level.

[Step 314] The data ADDATA from A/D converter 62 is read into "A" register in CPU 60.

[Step 315] The output signal ADST of CPU 60 is driven low to terminate the operation of A/D converter 62.

[Step 316] To execute the above described digital integrating operation, the respective values in the internal memories M(B1T) and M(WT) are multiplied. This result is subtracted from the value in "A" register set with the displacement output of the angular displacement sensor, and what is obtained is set to "B" register.

[Step 317] The multiplied result of the respective values in the internal memories M(A1T) and M(WT) is added to the multiplied result of the respective values in the internal memory M(A0T) and "B" register, and what is obtained is set to "C" register.

[Step 318] The value in the above described "C" register is multiplied by the value in memory M(T1) set with the integrating operation gain of the present embodiment, and what is obtained is set to "D" register.

[Step 319] The value in the above described "B" register is set to the internal memory M(WT) to terminate integrating operation.

[Step 320] The output signal DAEND of D/A converter 63 is driven high to start D/A operation by D/A converter 63.

[Step 321] The content DADATA in "D" register is transferred to D/A converter 63.

[Step 322] It is judged whether the output signal DAEND of D/A converter 63 has been driven high, and the system proceeds to Step 323 upon attainment of "H" level.

[Step 323] The output signal DAST of CPU 60 is set to low to terminate the operation of D/A converter 63.

As has been described, a predetermined integrating operation is executed with respect to the output value of angular displacement sensor obtained through A/D converter 62 in accordance with data in EEPROM 64. Since a current proportional to such result is conducted to the wound coil 4 within the angular displacement sensor, the integrating characteristic of the angular displacement sensor may be controlled at will.

In the above described embodiments, control of the angular displacement sensor itself is performed by digital operation (proportional operation, differential operation, integrating operation) processing and the parameters of such operation are set by a nonvolatile memory (EEPROM in the embodiments) which is electrically rewritable in an unrestricted manner during its process. Therefore, there are such advantages as that individual variance of angular displacement sensors may be corrected and that the characteristic of the angular displacement sensors may be varied at will.

What is claimed is:

1. An apparatus used for an image blur prevention, the apparatus which drives image blur correction means in accordance with an output corresponding to a detected vibration amount, and which performs a feedback loop control for driving said image blur correction means on the basis of a difference between an actual driven amount of image blur correction means and said output corresponding to the detected vibration amount, comprising:

a signal processing portion which processes a signal corresponding to an image blur to generate a signal used in image blur prevention, said signal processing portion performing said signal processing by using a predetermined parameter, said predetermined parameter being directed to a loop gain of an image blur prevention control loop, said loop gain of the image blur prevention control loop being varied in accordance with a variation of said predetermined parameter;

a non-volatile memory capable of rewriting data stored therein; and a setting portion which reads out data from said non-volatile memory and sets the predetermined parameter used by said signal processing portion corresponding to said readout data.

2. An optical apparatus to which an image blur prevention device for preventing image blur is adapted, the apparatus which drives image blur correction means in accordance with an output corresponding to a detected vibration amount, and which performs a feedback loop control for driving said image blur correction means on the basis of a difference between an actual driven amount of image blur correction means and said output corresponding to the detected vibration amount, comprising:

a signal processing portion which processes a signal corresponding to an image blur to generate a signal used in image blur prevention, said signal processing portion performing said signal processing by using a predetermined parameter, said predetermined parameter being directed to a loop gain of an image blur prevention control loop, said loop gain of the image blur prevention control loop being varied in accordance with a variation of said predetermined parameter;

a non-volatile memory capable of rewriting data stored therein; and a setting portion which reads out data from said non-volatile memory and sets the predetermined parameter used by said signal processing portion corresponding to said readout data.

3. A camera to which an image blur prevention device for preventing image blur is adapted, the camera which drives image blur correction means in accordance with an output corresponding to a detected vibration amount, and which performs a feedback loop control for driving said image blur correction means on the basis of a difference between an actual driven amount of image blur correction means and said output corresponding to the detected vibration amount, comprising:

a signal processing portion which processes a signal corresponding to an image blur to generate a signal used in image blur prevention, said signal processing portion performing said signal processing by using a predetermined parameter, said predetermined parameter being directed to a loop gain of an image blur prevention control loop, said loop gain of the image blur prevention control loop being varied in accordance with a variation of said predetermined parameter;

a non-volatile memory capable of rewriting data stored therein; and a setting portion which reads out data from said non-volatile memory and sets the predetermined parameter used by said signal processing portion corresponding to said readout data.

4. An image blur prevention apparatus, the apparatus which drives image blur correction means in accordance with an output corresponding to a detected vibration amount, and which performs a feedback loop control for driving said image blur correction means on the basis of a difference between an actual driven amount of image blur correction means and said output corresponding to the detected vibration amount, comprising:

an image blur prevention device which prevents image blur;

a signal processing portion which processes a signal corresponding to an image blur to generate a signal used in said image blur prevention device, said signal processing portion performing said signal processing by using a predetermined parameter, said predetermined parameter being directed to a loop gain of an image blur prevention control loop, said loop gain of the image blur prevention control loop being varied in accordance with a variation of said predetermined parameter;

a non-volatile memory capable of rewriting data stored therein; and a setting portion which reads out data from said non-volatile memory and sets the predetermined parameter used by said signal processing portion corresponding to said readout data.

5. An apparatus adapted for an image blur prevention device, the apparatus which drives image blur correction means in accordance with an output corresponding to a detected vibration amount, and which performs a feedback loop control for driving said image blur correction means on the basis of a difference between an actual driven amount of image blur correction means and said output corresponding to the detected vibration amount, comprising:

a signal processing portion which processes a signal corresponding to an image blur to generate a signal used in image blur prevention, said signal processing portion performing said signal processing by using a predetermined parameter, said predetermined parameter being directed to a loop gain of an image blur prevention control loop, said loop gain of the image blur prevention control loop being varied in accordance with a variation of said predetermined parameter;

a non-volatile memory capable of rewriting data stored therein; and a setting portion which reads out data from said non-volatile memory and sets the predetermined parameter used by said signal processing portion corresponding to said readout data.

6. An apparatus according to claim 1, wherein the data stored in said non-volatile memory is used in respect to controlling driving of a correction optical system.

7. An apparatus according to claim 6, wherein the data stored in said non-volatile memory is used to compensate for manufacturing variance in said correction optical system.

8. An apparatus according to claim 6, wherein the data stored in said non-volatile memory is used to set a loop gain of said correction optical system.

9. An apparatus according to claim 6, wherein the data stored in said non-volatile memory is used to provide phase compensation in said correction optical system.

10. An apparatus according to claim 6, wherein the data stored in said non-volatile memory is used to compensate for an offset in said correction optical system.

11. An apparatus according to claim 1, wherein the data stored in said non-volatile memory is used to set an operating characteristic of an angular displacement sensor.

12. An apparatus according to claim 11, wherein the data stored in said non-volatile memory is used to compensate for manufacturing variance in said angular displacement sensor.

13. An apparatus according to claim 11, wherein the data stored in said non-volatile memory is used to set a spring constant for said angular displacement sensor.

14. An apparatus according to claim 11, wherein the data stored in said non-volatile memory is used to set a viscosity coefficient of said angular displacement sensor.

15. An apparatus according to claim 11, wherein the data stored in said non-volatile memory is used to set an integrating characteristic of said angular displacement sensor.

16. An apparatus used for an image blur prevention, the apparatus which drives image blur correction means in accordance with an output corresponding to a detected vibration amount, and which performs a feedback loop control for driving said image blur correction means on the basis of a difference between an actual driven amount of image blur correction means and said output corresponding to the detected vibration amount, comprising:
- a signal processing portion which processes a signal corresponding to an image blur to generate a signal used in image blur prevention, said signal processing portion performing said signal processing by using a predetermined parameter, said predetermined parameter being directed to a parameter used for phase compensation operation of an image blur prevention control loop, said parameter used for phase compensation operation of the image blur prevention control loop being varied in accordance with a variation of said predetermined parameter;
- a non-volatile memory capable of rewriting data stored therein; and
- a setting portion which reads out data from said non-volatile memory and sets the predetermined parameter used by said signal processing portion corresponding to said readout data.

17. An optical apparatus to which an image blur prevention device for preventing image blur is adapted, the apparatus which drives image blur correction means in accordance with an output corresponding to a detected vibration amount, and which performs a feedback loop control for driving said image blur correction means on the basis of a difference between an actual driven amount of image blur correction means and said output corresponding to the detected vibration amount, comprising:
- a signal processing portion which processes a signal corresponding to an image blur to generate a signal used in image blur prevention, said signal processing portion performing said signal processing by using a predetermined parameter, said predetermined parameter being directed to a parameter used for phase compensation operation of an image blur prevention control loop, said parameter used for phase compensation operation of the image blur prevention control loop being varied in accordance with a variation of said predetermined parameter;
- a non-volatile memory capable of rewriting data stored therein; and
- a setting portion which reads out data from said non-volatile memory and sets the predetermined parameter used by said signal processing portion corresponding to said readout data.

18. A camera to which an image blur prevention device for preventing image blur is adapted, the camera which drives image blur correction means in accordance with an output corresponding to a detected vibration amount, and which performs a feedback loop control for driving said image blur correction means on the basis of a difference between an actual driven amount of image blur correction means and said output corresponding to the detected vibration amount, comprising:
- a signal processing portion which processes a signal corresponding to an image blur to generate a signal used in image blur prevention, said signal processing portion performing said signal processing by using a predetermined parameter, said predetermined parameter being directed to a parameter used for phase compensation operation of an image blur prevention control loop, said parameter used for phase compensation operation of the image blur prevention control loop being varied in accordance with a variation of said predetermined parameter;
- a non-volatile memory capable of rewriting data stored therein; and
- a setting portion which reads out data from said non-volatile memory and sets the predetermined parameter used by said signal processing portion corresponding to said readout data.

19. An image blur prevention apparatus, the apparatus which drives image blur correction means in accordance with an output corresponding to a detected vibration amount, and which performs a feedback loop control for driving said image blur correction means on the basis of a difference between an actual driven amount of image blur correction means and said output corresponding to the detected vibration amount, comprising:
- an image blur prevention device which prevents image blur;
- a signal processing portion which processes a signal corresponding to an image blur to generate a signal used in said image blur prevention device, said signal processing portion performing said signal processing by using a predetermined parameter, said predetermined parameter being directed to a parameter used for phase compensation operation of an image blur prevention control loop, said parameter used for phase compensation operation of the image blur prevention control loop being varied in accordance with a variation of said predetermined parameter;
- a non-volatile memory capable of rewriting data stored therein; and
- a setting portion which reads out data from said non-volatile memory and sets the predetermined parameter used by said signal processing portion corresponding to said readout data.

20. An apparatus adapted for an image blur prevention device, the apparatus which drives image blur correction means in accordance with an output corresponding to a detected vibration amount, and which performs a feedback loop control for driving said image blur correction means on the basis of a difference between an actual driven amount of image blur correction means and said output corresponding to the detected vibration amount, comprising:
- a signal processing portion which processes a signal corresponding to an image blur to generate a signal used in image blur prevention, said signal processing portion performing said signal processing by using a predetermined parameter, said predetermined parameter being directed to a parameter used for phase compensation operation of an image blur prevention control loop, said parameter used for phase compensation operation of the image blur prevention control loop being varied in accordance with a variation of said predetermined parameter;

a non-volatile memory capable of rewriting data stored therein; and a setting portion which reads out data from said non-volatile memory and sets the predetermined parameter used by said signal processing portion corresponding to said readout data.

21. An apparatus used for an image blur prevention, the apparatus which drives image blur correction means in accordance with an output corresponding to a detected vibration amount, and which performs a feedback loop control for driving said image blur correction means on the basis of a difference between an actual driven amount of image blur correction means and said output corresponding to the detected vibration amount, comprising:

a signal processing portion which processes a signal corresponding to an image blur to generate a signal used in image blur prevention, said signal processing portion performing said signal processing by using a predetermined parameter, said predetermined parameter being directed to a parameter corresponding to an offset value used for correction operation of an image blur prevention control loop, said parameter corresponding to an offset value used for correction operation of the image blur prevention control loop being varied in accordance with a variation of said predetermined parameter;

a non-volatile memory capable of rewriting data stored therein; and a setting portion which reads out data from said non-volatile memory and sets the predetermined parameter used by said signal processing portion corresponding to said readout data.

22. An optical apparatus to which an image blur prevention device for preventing image blur is adapted, the apparatus which drives image blur correction means in accordance with an output corresponding to a detected vibration amount, and which performs a feedback loop control for driving said image blur correction means on the basis of a difference between an actual driven amount of image blur correction means and said output corresponding to the detected vibration amount, comprising:

a signal processing portion which processes a signal corresponding to an image blur to generate a signal used in image blur prevention, said signal processing portion performing said signal processing by using a predetermined parameter, said predetermined parameter being directed to a parameter corresponding to an offset value used for correction operation of an image blur prevention control loop, said parameter corresponding to an offset value used for correction operation of the image blur prevention control loop being varied in accordance with a variation of said predetermined parameter;

a non-volatile memory capable of rewriting data stored therein; and a setting portion which reads out data from said non-volatile memory and sets the predetermined parameter used by said signal processing portion corresponding to said readout data.

23. A camera to which an image blur prevention device for preventing image blur is adapted, the camera which drives image blur correction means in accordance with an output corresponding to a detected vibration amount, and which performs a feedback loop control for driving said image blur correction means on the basis of a difference between an actual driven amount of image blur correction means and said output corresponding to the detected vibration amount, comprising:

a signal processing portion which processes a signal corresponding to an image blur to generate a signal used in image blur prevention, said signal processing portion performing said signal processing by using a predetermined parameter, said predetermined parameter being directed to a parameter corresponding to an offset value used for correction operation of an image blur prevention control loop, said parameter corresponding to an offset value used for correction operation of the image blur prevention control loop being varied in accordance with a variation of said predetermined parameter;

a non-volatile memory capable of rewriting data stored therein; and a setting portion which reads out data from said non-volatile memory and sets the predetermined parameter used by said signal processing portion corresponding to said readout data.

24. An image blur prevention apparatus, the apparatus which drives image blur correction means in accordance with an output corresponding to a detected vibration amount, and which performs a feedback loop control for driving said image blur correction means on the basis of a difference between an actual driven amount of image blur correction means and said output corresponding to the detected vibration amount, comprising:

an image blur prevention device which prevents image blur;

a signal processing portion which processes a signal corresponding to an image blur to generate a signal used in said image blur prevention device, said signal processing portion performing said signal processing by using a predetermined parameter, said predetermined parameter being directed to a parameter corresponding to an offset value used for correction operation of an image blur prevention control loop, said parameter corresponding to an offset value used for correction operation of the image blur prevention control loop being varied in accordance with a variation of said predetermined parameter;

a non-volatile memory capable of rewriting data stored therein; and a setting portion which reads out data from said non-volatile memory and sets the predetermined parameter used by said signal processing portion corresponding to said readout data.

25. An apparatus adapted for an image blur prevention device, the apparatus which drives image blur correction means in accordance with an output corresponding to a detected vibration amount, and which performs a feedback loop control for driving said image blur correction means on the basis of a difference between an actual driven amount of image blur correction means and said output corresponding to the detected vibration amount, comprising:

a signal processing portion which processes a signal corresponding to an image blur to generate a signal used in image blur prevention, said signal processing portion performing said signal processing by using a predetermined parameter, said predetermined parameter being directed to a parameter corresponding to an offset value used for correction operation of an image blur prevention control loop, said parameter corresponding to an offset value used for correction operation of the image blur prevention control loop being varied in accordance with a variation of said predetermined parameter;

a non-volatile memory capable of rewriting data stored therein; and a setting portion which reads out data from said non-volatile memory and sets the predetermined parameter used by said signal processing portion corresponding to said readout data.

* * * * *

UNITED STATES PATENT AND TRADEMARK OFFICE
CERTIFICATE OF CORRECTION

PATENT NO. : 6,070,015
DATED : May 30, 2000
INVENTOR(S) : Yasuhiko Shiomi

Page 1 of 1

It is certified that error appears in the above-identified patent and that said Letters Patent is hereby corrected as shown below:

Column 14,
Line 34, delete "M(ALT)" and insert -- M(A1T) --.

Signed and Sealed this

Eleventh Day of September, 2001

Attest:

NICHOLAS P. GODICI
*Attesting Officer*  *Acting Director of the United States Patent and Trademark Office*